United States Patent
Kim et al.

(10) Patent No.: US 11,091,604 B2
(45) Date of Patent: Aug. 17, 2021

(54) THERMOPLASTIC RESIN COMPOSITION HAVING EXCELLENT ELECTRICAL PROPERTIES, AND MOLDED ARTICLE PRODUCED USING SAME

(71) Applicant: Lotte Advanced Materials Co., Ltd., Yeosu-si (KR)

(72) Inventors: Pilho Kim, Uiwang-si (KR); Sunyoung Kim, Uiwang-si (KR); Suji Kim, Uiwang-si (KR); Seungshik Shin, Uiwang-si (KR); Woo Jin Lee, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 16/469,319

(22) PCT Filed: Oct. 31, 2017

(86) PCT No.: PCT/KR2017/012149
§ 371 (c)(1),
(2) Date: Jun. 13, 2019

(87) PCT Pub. No.: WO2018/110824
PCT Pub. Date: Jun. 21, 2018

(65) Prior Publication Data
US 2020/0109261 A1    Apr. 9, 2020

(30) Foreign Application Priority Data
Dec. 14, 2016 (KR) .................. 10-2016-0170583

(51) Int. Cl.
C08K 5/523    (2006.01)
C08K 3/34     (2006.01)
C08K 5/42     (2006.01)
C08K 7/00     (2006.01)
H02G 3/08     (2006.01)

(52) U.S. Cl.
CPC ............... C08K 5/523 (2013.01); C08K 3/34 (2013.01); C08K 5/42 (2013.01); C08K 7/00 (2013.01); H02G 3/088 (2013.01)

(58) Field of Classification Search
CPC . C08K 5/523; C08K 3/34; C08K 5/42; C08K 7/00; H02G 3/088
See application file for complete search history.

(56) References Cited

U.S. PATENT DOCUMENTS

| | | | |
|---|---|---|---|
| 6,531,534 B1 * | 3/2003 | Katayama | C08K 5/523 524/145 |
| 6,828,366 B2 | 12/2004 | Seidel et al. | |
| 7,553,895 B2 | 6/2009 | An et al. | |
| 7,659,332 B2 | 2/2010 | Kang et al. | |
| 9,771,467 B2 | 9/2017 | Han et al. | |
| 2003/0105196 A1 | 6/2003 | Seidel et al. | |
| 2005/0245648 A1 | 11/2005 | Lim et al. | |
| 2011/0275743 A1 | 11/2011 | Ishii et al. | |
| 2013/0313493 A1 | 11/2013 | Wen et al. | |
| 2013/0317141 A1 | 11/2013 | Cheng et al. | |
| 2013/0317142 A1 | 11/2013 | Chen et al. | |
| 2013/0317143 A1 | 11/2013 | Daga et al. | |
| 2013/0317144 A1 | 11/2013 | Wu et al. | |
| 2013/0317145 A1 | 11/2013 | An et al. | |
| 2013/0317146 A1 | 11/2013 | Li et al. | |
| 2013/0317147 A1 | 11/2013 | Lie et al. | |
| 2013/0317148 A1 | 11/2013 | Zheng et al. | |
| 2013/0317149 A1 | 11/2013 | Zhao et al. | |
| 2013/0331492 A1 | 12/2013 | Sharma | |
| 2014/0303296 A1 | 10/2014 | Inazawa et al. | |
| 2014/0371360 A1 | 12/2014 | Zheng et al. | |
| 2015/0140248 A1 | 5/2015 | Ra et al. | |
| 2015/0307707 A1 | 10/2015 | Jung et al. | |
| 2015/0329719 A1 | 11/2015 | Jung et al. | |
| 2015/0344670 A1 | 12/2015 | Han et al. | |
| 2016/0024301 A1 * | 1/2016 | Hayashida | C08L 83/10 523/452 |
| 2016/0185956 A1 | 6/2016 | Jung et al. | |
| 2019/0359820 A1 | 11/2019 | Kim et al. | |

FOREIGN PATENT DOCUMENTS

| | | |
|---|---|---|
| CN | 1296515 A | 5/2001 |
| CN | 1408008 A | 4/2003 |
| CN | 1649961 A | 8/2005 |
| CN | 101434743 A | 5/2009 |
| CN | 102307947 A | 1/2012 |
| CN | 103958607 A | 7/2014 |
| CN | 104650565 A | 5/2015 |
| CN | 104812820 A | 7/2015 |

(Continued)

OTHER PUBLICATIONS

International Search Report in counterpart International Application No. PCT/KR2017/012149 dated Feb. 12, 2018, pp. 1-4.
International Search Report in commonly owned International Application No. PCT/KR2017/012792 dated Feb. 19, 2018, pp. 1-4.
Office Action in commonly owned U.S. Appl. No. 16/469,838 dated Jun. 22, 2020, pp. 1-11.
Extended Search Report in commonly owned European Application No. 17884617.6 dated Apr. 8, 2020, pp. 1-8.
Extended European Search Report in counterpart European Patent Application No. 17880465.4, dated Jun. 25, 2020, pp. 1-8.
Machine translation of JP 2010-196009, pp. 1-37, 2010.
Office Action in counterpart Chinese Application No. 201780077638.7 dated Nov. 4, 2020, pp. 1-10.
English-translation of Office Action in counterpart Chinese Application No. 201780077638.7 dated Nov. 4, 2020, pp. 1-13.

(Continued)

*Primary Examiner* — John E Uselding
(74) *Attorney, Agent, or Firm* — Additon, Pendelton & Witherspoon, P.A.

(57) ABSTRACT

Provided is a thermoplastic resin composition having excellent electric properties and the thermoplastic resin composition comprises: (A) 100 parts by weight of a polycarbonate resin; (B) 2 to 6 parts by weight of a phosphorous-based flame retardant; and (C) 0.2 parts by weight to 2 parts by weight of a mineral filler.

11 Claims, No Drawings

(56) References Cited

FOREIGN PATENT DOCUMENTS

| | | | |
|---|---|---|---|
| CN | 104812824 A | 7/2015 | |
| CN | 104812825 A | 7/2015 | |
| CN | 105051110 A | 11/2015 | |
| CN | 105315640 A | 2/2016 | |
| CN | 106009587 A | 10/2016 | |
| EP | 0728811 A2 | 8/1996 | |
| JP | 2004-027113 A | 1/2004 | |
| JP | 2005-015659 A | 1/2005 | |
| JP | 2007-308529 A | 11/2007 | |
| JP | 4146175 B2 | 9/2008 | |
| JP | 2010-196009 A | 9/2010 | |
| JP | 5179731 B2 | 4/2013 | |
| JP | 5237511 B2 | 7/2013 | |
| JP | 5405738 B2 | 2/2014 | |
| JP | 2015-227421 A | 12/2015 | |
| JP | 2016-084414 A | 5/2016 | |
| JP | 2016-102219 A | 6/2016 | |
| KR | 10-2002-0079944 A | 10/2002 | |
| KR | 10-2005-0023868 A | 10/2005 | |
| KR | 10-0722149 | 5/2007 | |
| KR | 10-2009-0020648 A | 2/2009 | |
| KR | 10-2015-0023441 A | 3/2015 | |
| KR | 10-2015-0059077 A | 5/2015 | |
| KR | 10-2015-0120823 A | 10/2015 | |
| KR | 10-2015-0139046 A | 12/2015 | |
| KR | 10-1578732 B1 | 12/2015 | |
| KR | 10-2016-0079786 A | 7/2016 | |
| KR | 10-2016-0058456 A | 9/2017 | |
| KR | 10-2015-0023463 A | 12/2018 | |
| WO | 2004-003078 A | 1/2004 | |
| WO | 2015/166381 A1 | 11/2015 | |
| WO | 2018/110824 A1 | 6/2018 | |
| WO | 2018/117424 A2 | 6/2018 | |

OTHER PUBLICATIONS

Final Office Action in commonly owned U.S. Appl. No. 16/469,838 dated Oct. 19, 2020, pp. 1-14.
Office Action in commonly owned Chinese Application No. 201780079506.8 dated Dec. 3, 2020, pp. 1-8.
English-translation of Office Action in commonly owned Chinese Application No. 201780079506.8 dated Dec. 3, 2020, pp. 1-8.
Office Action in counterpart Chinese Application No. 201780077638.7 dated May 24, 2021, pp. 1-7.
English-translation of Office Action in counterpart Chinese Application No. 201780077638.7 dated May 24, 2021, pp. 1-8.

* cited by examiner

THERMOPLASTIC RESIN COMPOSITION HAVING EXCELLENT ELECTRICAL PROPERTIES, AND MOLDED ARTICLE PRODUCED USING SAME

CROSS-REFERENCE TO RELATED APPLICATIONS

This application claims priority to and the benefit of International Application No. PCT/KR2017/012149, filed Oct. 31, 2017, which published as WO 2018/110824 on Jun. 21, 2018; and Korean Patent Application No. 10-2016-0170583, filed in the Korean Intellectual Property Office on Dec. 14, 2016, the entire disclosure of each of which is incorporated herein by reference.

TECHNICAL FIELD

A thermoplastic resin composition having excellent electrical properties and a molded article produced using the same are disclosed.

BACKGROUND ART

A polycarbonate resin is an engineering plastic having excellent mechanical strength, high heat resistance, transparency, and the like, and therefore may be resin used in various fields such as office automation devices, electric/electronic parts, architectural materials, and the like. In the field of electric/electronic parts, resins used as external components of a laptop and a computer require high flame retardancy and also, high strength due to slimming and thinning of TV, a monitor, and a laptop.

When this resin composition is used, a phosphorus-based flame retardant should be used to realize flame retardancy, but when the phosphorus-based flame retardant is used in an excessive amount to further improve the flame retardancy, heat resistance of the polycarbonate composition is deteriorated.

DETAILED DESCRIPTION OF THE INVENTION

Technical Problem

An embodiment provides a thermoplastic resin composition having excellent flame retardancy and electrical properties.

Another embodiment provides a thermoplastic resin composition having excellent heat resistance and simultaneously flame retardancy characteristics, as well as electrical properties such as a comparative tracking index (CTI).

Another embodiment provides a molded article produced using the thermoplastic resin composition.

These and other objects of the present invention may be achieved by the present invention described below.

Technical Solution

An embodiment provides a thermoplastic resin composition having excellent electrical properties including (A) 100 parts by weight of polycarbonate; (B) 2 parts by weight to 6 parts by weight of a phosphorus-based flame retardant; and (C) 0.2 parts by weight to 2 parts by weight of a mineral filler.

The mineral filler may be talc, a whisker, silica, mica, wollastonite, a basalt fiber, or a combination thereof and the mineral filler may be sheet-shaped talc.

An amount of the mineral filler may be 1 part by weight to 1.5 parts by weight based on 100 parts by weight of the polycarbonate resin.

A weight average molecular weight (Mw) of the polycarbonate resin may be 10,000 g/mol to 200,000 g/mol.

The thermoplastic resin composition may have a comparative tracking index (CTI) value of 250 V to 600 V.

The thermoplastic resin composition may have a grade V0 in a UL94 vertical flame retardancy test.

The thermoplastic resin composition may be used as materials for electric and electronic parts and may be used for power boxes in white appliances.

Another embodiment provides a plastic molded article produced by the thermoplastic resin composition.

Advantageous Effects

The thermoplastic resin composition having excellent electrical properties according to an embodiment uses a phosphorus-based flame retardant including no halogen and thus is environment-friendly due to no generation of halogen-based gas and has excellent flame retardancy, heat resistance, and electrical properties and accordingly, may be usefully used as a material for electric•electronic parts.

DESCRIPTION OF THE DRAWINGS

A thermoplastic resin composition having excellent electric properties according to an embodiment includes (A) 100 parts by weight of polycarbonate; (B) 2 parts by weight to 6 parts by weight of a phosphorus-based flame retardant; and (C) 0.2 parts by weight to 2 parts by weight of a mineral filler.

Hereinafter, the present invention is described in detail.

(A) Polycarbonate Resin

The (A) thermoplastic polycarbonate resin that is a component used for preparing the resin composition of the present invention is an aromatic polycarbonate resin prepared by reacting diphenols represented by Chemical Formula 1 with phosgene, halogen formate, or carbonate diester.

[Chemical Formula 1]

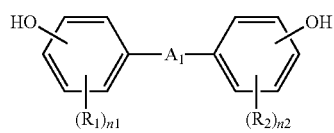

In Chemical Formula 1, $A_1$ is selected from a single bond, a substituted or unsubstituted C1 to C5 alkylene, a substituted or unsubstituted C1 to C5 alkylidene, a substituted or unsubstituted C3 to C6 cycloalkylene, a substituted or unsubstituted C5 to C6 cycloalkylidene, CO, S, and $SO_2$, $R_1$ and $R_2$ are independently selected from a substituted or unsubstituted C1 to C30 alkyl and a substituted or unsubstituted C6 to C30 aryl, and $n_1$ and $n_2$ are independently an integer ranging from 0 to 4.

The term "substituted" refers to a group which at least one hydrogen is substituted with a substituent selected from a halogen, a C1 to C30 alkyl, a C1 to C30 haloalkyl, a C6 to C30 aryl, a C2 to C30 heteroaryl, a C1 to C20 alkoxy, and a combination thereof.

Examples of the diphenol may be hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like. Among the diphenols, 2,2-bis-(4-hydroxyphenyl)-propane, 2,2-bis-(3,5-dichloro-4-hydroxyphenyl)-propane, or 1,1-bis-(4-hydroxyphenyl)-cyclohexane may be desirably used. In addition, 2,2-bis-(4-hydroxyphenyl)-propane that is referred to as bisphenol-A may be desirably used.

A weight average molecular weight (Mw) of the polycarbonate resin may be 10,000 g/mol to 200,000 g/mol, according to an embodiment, 15,000 g/mol to 80,000 g/mol, but is not limited thereto.

The polycarbonate resin may be a mixture of copolymers prepared from two types of diphenols. In addition, the polycarbonate resin may be a linear polycarbonate resin, a branched polycarbonate resin, a polyestercarbonate copolymer resin, and the like.

The linear polycarbonate resin may be a bisphenol-A-based polycarbonate resin.

The branched polycarbonate resin may be prepared by reacting a multi-functional compound having at least tri functional groups, for example a compound having trivalent or more phenolic groups, for specific examples a multi-functional aromatic compound such as trimellitic anhydride, trimellitic acid, and the like with diphenols and a carbonate. The multi-functional aromatic compound may be included in an amount of 0.05 mol % to 2.0 mol % based on a total amount of branched polycarbonate resin.

The polyester carbonate copolymer resin may be prepared by reacting bifunctional carboxylic acid with diphenols and carbonate. The carbonate may be diaryl carbonate such as diphenyl carbonate or ethylene carbonate.

The polycarbonate resin may be preferably homo-polycarbonate resin, co-polycarbonate resin, or a blend of co-polycarbonate resin and homo-polycarbonate resin.

(B) Phosphorus-based Flame Retardant

The phosphorus-based flame retardant used in the resin composition of the present invention is used for improving flame retardancy of the polycarbonate resin composition and may be a general flame retardant.

The phosphorus-based flame retardant according to an embodiment may be an aromatic phosphoric acid ester compound, and specifically a compound represented by Chemical Formula 2.

[Chemical Formula 2]

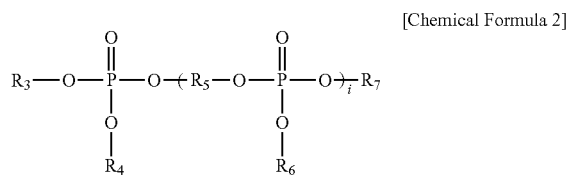

In Chemical Formula 2, $R_3$, $R_4$, $R_6$, and $R_7$ are independently a hydrogen atom, a C6-C20 aryl group, or a C6-C20 aryl group substituted with a C1-C10 alkyl group, $R_5$ is a C6-C20 arylene group or a C6-C20 arylene group substituted with a C1-C10 alkyl group, and i is an integer ranging from 0 to 4.

When i is 0, the compound represented by Chemical Formula 2 may be diarylphosphate such as diphenylphosphate, and the like, triphenylphosphate, tricresyl phosphate, trixylenylphosphate, tri(2,6-dimethylphenyl)phosphate, tri (2,4,6-trimethylphenyl)phosphate, tri(2,4-ditertiary-butylphenyl)phosphate, tri (2,6-dimethylphenyl)phosphate, and the like, and when i is 1, it may be bisphenol A bis(diphenylphosphate), resorcinol bis(diphenyl)phosphate, resorcinol bis(2,6-dimethylphenyl)phosphate, resorcinol bis (2,4-ditertiarybutylphenyl)phosphate, hydroquinone bis (2,6-dimethylphenyl)phosphate, hydroquinol bis (2,4-ditertiarybutylphenyl)phosphate, and the like.

The compounds of Chemical Formula 2 may be used alone or as a mixture.

Since the phosphorus-based flame retardant does not include a halogen element, a use of the resin composition including the phosphorus-based flame retardant does not generate a halogen-based gas, so that an environment-friendly effect that does not cause environmental pollution may be obtained.

In an embodiment, an amount of the (B) phosphorus-based flame retardant may be 2 parts by weight to 6 parts by weight, or 3 parts by weight to 5 parts by weight. When the amount of the phosphorus-based flame retardant is less than 2 parts by weight, flame retardancy may be deteriorated, while when it exceeds 6 parts by weight, thermal stability may be deteriorated, which is not suitable.

(C) Mineral Filler

The mineral filler used in the present invention may improve flame retardancy of the thermoplastic resin composition. As the filler, a conventional organic filler or inorganic filler may be used. For example, it may be an inorganic filler such as whisker, silica, mica, wollastonite, a basalt fiber, or a mixture thereof and the like. Specifically, talc may be used and more specifically sheet-shaped talc may be used. The sheet-shaped talc as the mineral filler may be most appropriate because it may more effectively maintain flame retardancy.

An average particle diameter (D50) of the mineral filler may be for example, 50 nm to 100 μm, but is not limited thereto. In the present specification, when a definition is not otherwise provided, the average particle diameter (D50) refers to a diameter of a particle with a cumulative volume of 50 volume % in a particle distribution.

An amount of the mineral filler may be 0.2 parts by weight to 2 parts by weight, for example 1 to 1.5 parts by weight based on 100 parts by weight of the polycarbonate resin. Within the ranges, the thermoplastic resin composition having excellent electrical properties, flame retardancy, and heat resistance may be obtained.

(D) Other Additives

The thermoplastic resin composition having excellent electrical properties according to an embodiment may further include an additive including a fluorinated polyolefin-based resin, an ultraviolet (UV) stabilizer, a fluorescent whitening agent, a lubricant, a release agent, a nucleating agent, a stabilizer, an inorganic material additive in addition to the above components, according to its use. In addition, an antistatic agent, a reinforcing material, a colorant such as a pigment or a dye, and the like may be included as other additives.

The fluorinated polyolefin-based resin may include polytetrafluoroethylene, polyvinylidenefluoride, a tetrafluoroethylene/vinylidenefluoride copolymer, a tetrafluoroethylene/hexafluoropropylene copolymer, and an ethylene/tetrafluoroethylene copolymer. These may be independently used, or a mixture of two different resins may be used.

When the fluorinated polyolefin-based resin is mixed and extruded with other components of the present invention, a fibrillar network is formed in the resin and accordingly, may deteriorate melting viscosity of the resin and increase a shrinkage rate during the combustion and thus play a role of preventing a dripping phenomenon of the resin.

The fluorinated polyolefin-based resin may be prepared by using a publicly-known polymerization method. For example, the fluorinated polyolefin-based resin may be prepared in an aqueous medium including a free radical-forming catalyst such as sodium, potassium, or ammonium peroxydisulfate, or the like under a pressure of 7 kg/cm$^2$ to 71 kg/cm$^2$ at 0° C. to 200° C. and preferably, at 20° C. to 100° C.

The fluorinated polyolefin-based resin may be used in an emulsion state or a powder state. The fluorinated polyolefin-based resin in the emulsion state has satisfactory dispersibility in the entire resin composition but may make a manufacturing process a little complex. If the fluorinated polyolefin-based resin is used in the powder state, it may be appropriately dispersed in the entire resin composition and form the fibrillar network and thus be easily used during the work, and accordingly, the fluorinated polyolefin-based resin in a powder state may be preferred.

The ultraviolet (UV) stabilizer suppresses a color change and a decrease in photo-reflectivity of the resin composition that may be caused by UV irradiation and examples of the UV stabilizer include a benzotriazole-based compound, a benzophenone-based compound, and a triazine-based compound.

The fluorescent whitening agent improves photo-reflectivity of a polycarbonate resin composition and examples of the fluorescent whitening agent include stilbene-bisbenzoxazole derivatives such as 4-(benzoxazol-2-yl)-4'-(5-methylbenzoxazol-2-yl)stilbene and 4,4'-bis(benzooxazol-2-yl) stilbene.

The lubricant may be modified montanic acid wax, a long chain ester of pentaerythritol, a fatty acid ester of neopentylpolyol, or a combination thereof.

The release agent may be a fluorine-containing polymer, silicone oil, a metal salt of stearate, a metal salt of montanic acid, a montanic acid ester wax, polyethylene wax, or a combination thereof.

The nucleating agent may be carbodiimide, zinc phenylphsophonate, copper phthalocyanine, talc, clay, or a combination thereof.

In addition, the stabilizer may be a hindered phenol primary antioxidant, for example, octadecyl 3-(3,5-di,t, butyl-4-hydroxy phenyl) propionate), bis(2,6-di-tert-butyl-4-methyl-phenyl)pentaerythritol diphosphite, tri(2,4-di-tert-butyl phenyl)phosphite, tetrakis(methylene-3-dodecylthio propionate)methane, or a combination thereof.

The inorganic material additive may be a glass fiber, silica, clay, calcium carbonate, calcium sulfate, or a glass bead.

The thermoplastic resin composition according to an embodiment may have a comparative tracking index (CTI) value of 250 V to 600 V. In addition, the thermoplastic resin composition may have a grade V0 in a UL94 vertical flame retardancy test.

The thermoplastic resin composition having such a configuration according to an embodiment may be useful as materials for electric and electronic parts. Particularly, the thermoplastic resin composition according to an embodiment may be usefully used for power boxes of white appliances such as refrigerators, washing machines, and the like.

MODE FOR PERFORMING INVENTION

The present invention will be further illustrated by the following examples, which are merely specific examples of the present invention and are not intended to limit or limit the scope of the present invention.

EXAMPLES

The (A) polycarbonate resin, (B) phosphorus-based flame retardant, and (C) mineral filler used in Examples of the present invention and Comparative Examples are as follows.

(A) Polycarbonate Resin

Bisphenol-A type polycarbonate having a weight average molecular weight of 25,000 g/mol was used.

(B) Phosphorus-based Flame Retardant

An aromatic phosphate ester-based compound (diarylphosphate ([(CH$_3$)$_2$C$_6$H$_3$O]$_2$P(O)OC$_6$H$_4$OP(O)[OC$_6$H$_3$ (CH$_3$)$_2$]$_2$), Product name: PX-200, Manufacturer: DAI-HACHI) was used.

(B-2) Metal Salt Flame Retardant

As the aromatic sulfonic acid metal salt (B-2), KSS (potassium diphenyl sulfone sulfonate) of SEAL SANDS CHEMICALS was used.

(C) Mineral Filler

Sheet-shaped talc (Product name: UPN HS-T 0.5, Manufacturer: HAYASHI, Average particle diameter (D50): 2.7 μm) was used.

Examples 1 to 3 and Comparative Examples 1 to 6

Each component was put according to an amount shown in Table 1 and then, melt and kneaded in a twin-screw melt extruder heated at 260° C. to prepare a thermoplastic resin composition in a chip state. The obtained chip was dried at 80° C. for greater than or equal to 5 hours and then, manufactured into a specimen for measuring flame retardancy and a specimen for evaluating mechanical characteristics by using a screw-type injector heated at 290° C.

TABLE 1

| | Examples | | | Comparative Examples | | | | | |
|---|---|---|---|---|---|---|---|---|---|
| Components | 1 | 2 | 3 | 1 | 2 | 3 | 4 | 5 | 6 |
| (A) Polycarbonate resin (parts by weight) | 100 | 100 | 100 | 100 | 100 | 100 | 100 | 100 | 100 |
| (B) Phosphorus-based flame retardant (parts by weight) | 3 | 4 | 3 | 1 | 8 | — | 3 | 3 | 3 |
| (B-2) Metal salt flame retardant (parts by weight) | — | — | — | — | — | 0.1 | — | — | — |

TABLE 1-continued

| | Examples | | | Comparative Examples | | | | | |
|---|---|---|---|---|---|---|---|---|---|
| Components | 1 | 2 | 3 | 1 | 2 | 3 | 4 | 5 | 6 |
| (C) Mineral filler (parts by weight) | 1 | 1 | 1.5 | 1 | 1 | 1 | — | 3 | 0.1 |

Thermal stability, transmittance, and flame retardancy of the specimens having each composition shown in Table 1 were evaluated in the following method, and the results are shown in Table 2.

Method of Evaluating Properties (1) CTI (Comparative Tracking Index): CTI (Comparative Tracking Index) of a 3.0 mm specimen was measured according ASTM D3638 by dropping 50 drops of a $NH_4Cl$ aqueous solution having a concentration of 0.1 wt % one by one drop for 30 seconds on the surfaces of the specimen and measuring a voltage when a carbonization did not occur, and herein, the higher CTI, the more excellent electrical properties.

(2) BPT (Ball Pressure Test): A ball pressure test at 125° C. of a 3.0 mm specimen was experimented according to KS C2006-1998 to evaluate dimensional stability when a stress was applied thereto at a high temperature, and a passed specimen was regarded to have excellent dimensional stability.

In this experiment, a criteria for Pass was given, when a specimen had a sunken dent had a diameter of less than 2 mm after imposing a static load of 20±4N to the specimen heated up to 125° C. for one hour by using a steel ball having diameter of 5 mm.

(3) Flame retardancy: Flame retardancy of a 2.0 mm specimen was measured according to the UL94 vertical test standard.

TABLE 2

| | Examples | | | Comparative Examples | | | | | |
|---|---|---|---|---|---|---|---|---|---|
| | 1 | 2 | 3 | 1 | 2 | 3 | 4 | 5 | 6 |
| CTI (V) | 265 | 267 | 256 | 245 | 264 | 244 | 600 | 239 | 600 |
| BPT (125° C.) | pass | pass | pass | pass | fail | pass | pass | pass | pass |
| Flame retardancy | V0 | V0 | V0 | Fail | V0 | Fail | Fail | V0 | Fail |

Referring to the results of Table 2, the thermoplastic resin compositions of Examples 1 to 3 exhibited high CTI without deteriorating flame retardancy and thus excellent electrical properties and also, BPT pass characteristics and thus excellent dimensional stability and particularly, numerical stability at a high temperature, thus thermal stability.

On the contrary, Comparative Example 1 not including a flame retardant at all exhibited deteriorated flame retardancy and deteriorated CTI, and Comparative Example 2 including an excessive amount of a phosphorus-based flame retardant exhibited excellent flame retardancy and CTI but deteriorated BPT characteristics. In addition, Comparative Example 3 using a metal salt flame retardant instead of the phosphorus-based flame retardant exhibited deteriorated CTI as well as deteriorated flame retardancy, Comparative Example 4 including no mineral filler exhibited deteriorated flame retardancy, and Comparative Example 5 using an excessive amount of a mineral filler exhibited excellent flame retardancy but deteriorated CTI and thus deteriorated electrical properties.

In addition, Comparative Example 6 using a small amount of the mineral filler exhibited excellent electrical properties and dimensional stability but deteriorated flame retardancy.

A simple modification or change of the present invention may be readily utilized by a person skilled in the art in this field, and all such modifications and alterations are included in the scope of the present invention.

The invention claimed is:

1. A thermoplastic resin composition having excellent electrical properties, comprising:
   (A) 100 parts by weight of a polycarbonate resin;
   (B) 2 parts by weight to 4 parts by weight of a phosphorus-based flame retardant represented by Chemical Formula 2:

[Chemical Formula 2]

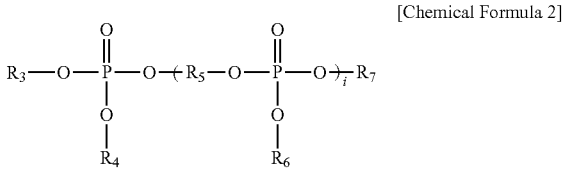

wherein:
   $R_3$, $R_4$, $R_6$, and $R_7$ are independently a hydrogen atom, a C6-C20 aryl group, or a C6-C20 aryl group substituted with a C1-C10 alkyl group,
   $R_5$ is a C6-C20 arylene group or a C6-C20 arylene group substituted with a C1-C10 alkyl group, and
   i is an integer ranging from 0 to 4; and
   (C) 1 part by weight to 1.5 parts by weight of talc.

2. The thermoplastic resin composition of claim 1, wherein the polycarbonate resin has a weight average molecular weight (Mw) of 10,000 g/mol to 200,000 g/mol.

3. The thermoplastic resin composition of claim 1, wherein the thermoplastic resin composition has a comparative tracking index (CTI) value of 250 V to 600 V measured in accordance with ASTM D3638.

4. The thermoplastic resin composition of claim 1, wherein the thermoplastic resin composition has a flame retardancy of V0 measured in accordance with a UL94 vertical flame retardancy test.

5. A molded article produced from the thermoplastic resin composition of claim 1.

6. The molded article of claim 5, wherein the molded article is an electric and/or electronic part.

7. The molded article of claim 5, wherein the molded article is a power box of a white appliance.

8. The thermoplastic resin composition of claim 1, wherein the polycarbonate resin (A) is an aromatic polycarbonate resin prepared by reacting a diphenol represented by Chemical Formula 1 with phosgene, halogen formate, or carbonate diester:

[Chemical Formula 1]

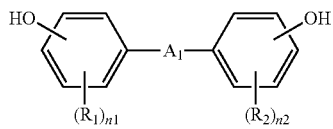

wherein in Chemical Formula 1,
$A_1$ is selected from a single bond, a substituted or unsubstituted C1 to C5 alkylene, a substituted or unsubstituted C1 to C5 alkylidene, a substituted or unsubstituted C3 to C6 cycloalkylene, a substituted or unsubstituted C5 to C6 cycloalkylidene, CO, S, and $SO_2$,
$R_1$ and $R_2$ are independently selected from a substituted or unsubstituted C1 to C30 alkyl and a substituted or unsubstituted C6 to C30 aryl, and
$n_1$ and $n_2$ are independently an integer ranging from 0 to 4.

9. The thermoplastic resin composition of claim 1, wherein the thermoplastic resin composition has a comparative tracking index (CTI) value of 250 V to 600 V measured in accordance with ASTM D3638 and a flame retardancy of V0 measured in accordance with a UL94 vertical flame retardancy test.

10. The thermoplastic resin composition of claim 9, wherein the thermoplastic resin composition passes a Ball Pressure Test (BPT) at 125° C. of a 3.0 mm specimen according to KS C2006-1998, wherein the specimen passes when the specimen has a sunken dent with a diameter of less than 2 mm after imposing a static load of 20±4N to the specimen heated up to 125° C. for one hour by using a steel ball having diameter of 5 mm.

11. The thermoplastic resin composition of claim 10, wherein the polycarbonate resin (A) is an aromatic polycarbonate resin prepared by reacting a diphenol represented by Chemical Formula 1 with phosgene, halogen formate, or carbonate diester:

[Chemical Formula 1]

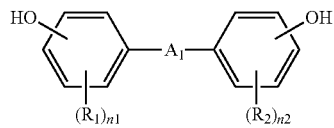

wherein in Chemical Formula 1,
$A_1$ is selected from a single bond, a substituted or unsubstituted C1 to C5 alkylene, a substituted or unsubstituted C1 to C5 alkylidene, a substituted or unsubstituted C3 to C6 cycloalkylene, a substituted or unsubstituted C5 to C6 cycloalkylidene, CO, S, and $SO_2$,
$R_1$ and $R_2$ are independently selected from a substituted or unsubstituted C1 to C30 alkyl and a substituted or unsubstituted C6 to C30 aryl, and
$n_1$ and $n_2$ are independently an integer ranging from 0 to 4.

* * * * *